United States Patent [19]

Clungeon et al.

[11] Patent Number: 5,435,841
[45] Date of Patent: Jul. 25, 1995

[54] INSOLUBILIZERS FOR BINDERS IN PAPER COATING COMPOSITIONS

[75] Inventors: Nancy Clungeon, Rock Hill, S.C.; Gregory J. Flynn, Pineville; Zhentao He, Charlotte, both of N.C.; Jose M. Rodriguez, Fort Mill, S.C.

[73] Assignee: Henkel Corporation, Plymouth Meeting, Pa.

[21] Appl. No.: 248,928

[22] Filed: May 25, 1994

[51] Int. Cl.$^6$ .................... C09D 7/12; C09D 103/02
[52] U.S. Cl. .................. 106/287.25; 106/214; 162/158; 548/317.5; 549/379
[58] Field of Search ............... 106/213, 214, 287.25; 162/158; 548/317.5; 549/379

[56] References Cited

U.S. PATENT DOCUMENTS

| | | | |
|---|---|---|---|
| 3,869,296 | 3/1975 | Kelly, Jr. et al. | 106/214 |
| 3,917,659 | 11/1975 | Glancy et al. | 260/555 |
| 4,471,087 | 9/1984 | Lipowski | 524/512 |
| 4,610,761 | 9/1986 | Eklund et al. | 162/158 |

FOREIGN PATENT DOCUMENTS 53-044567 11/1978 Japan .

*Primary Examiner*—David Brunsman
*Attorney, Agent, or Firm*—Ernest G. Szoke; Wayne C. Jaeschke; Real J. Grandmaison

[57] ABSTRACT

This invention relates generally to insolubilizers for use with binders in paper coating compositions. There is provided a process for preparing both an insolubilizer and paper coating composition containing the insolubilizer and a binder which, when applied onto paper products, significantly enhances their wet-rub resistance.

The insolubilizer is prepared by:

(a) forming a glyoxal-urea adduct by reacting from about 1.0 to about 4.0 moles of glyoxal with about 1.0 mole of urea, at an elevated temperature, (b) cooling the glyoxal-urea adduct to room temperature, (c) adding from about 0.5 to about 2.0 moles of free glyoxal to the glyoxal-urea adduct to form an oligomer, and (d) adjusting the pH of the oligomer to from about 5 to about 7.

18 Claims, 3 Drawing Sheets

INSOLUBILIZERS FOR BINDERS IN PAPER COATING COMPOSITIONS

FIELD OF THE INVENTION

This invention relates generally to insolubilizers for use with binders in paper coating compositions. More particularly, there is provided a process for preparing both an insolubilizer and paper coating composition containing the insolubilizer which, when applied onto paper products, significantly enhances their wet-rub resistance.

BACKGROUND OF THE INVENTION

This invention relates to paper coating compositions. More particularly, it relates to novel compositions for insolubilizing the binders in coatings for paper.

Paper coating compositions are generally a fluid suspension of pigment, such as clay with or without titanium dioxide, calcium carbonate, or the like, in an aqueous medium which includes a binder, such as starch, protein, or latex, to adhere the pigment to the paper.

The hydrophilic nature of the binder requires the presence of an insolubilizing material which crosslinks the binder, making it hydrophobic and thus improving the characteristics of the surface of the coated paper.

The most widely-used crosslinking materials are glyoxal and formaldehyde-donor agents such as melamine-formaldehyde, urea-melamine-formaldehyde, and partially or wholly methylated derivatives thereof.

Glyoxal is a highly reactive monomer which cures quickly and has excellent insolubilizing properties. As a result of this rapid crosslinking of glyoxal and binder, however, the viscosity of the coating composition increases so rapidly and is so great that the composition cannot be used. Frequently, glyoxal-insolubilized coatings gel completely, particularly in high solids formulations; gelling can occur also in moderate or low solids formulations if they are not used promptly. Thus, in situations where it is required that the viscosity remain stable for many hours, for example when high solids coatings are to be applied by blade coating techniques, a glyoxal system is unsuitable.

Melamine-formaldehyde resins do not build viscosity in the coating compositions, but they have the disadvantage of having an unpleasant odor and of releasing free formaldehyde. Curing with such resins involves the crosslinking of the binder molecule with the methylol or methylated methylol group of the melamine resin, usually in an acid or neutral coating, and full insolubilization of the binder takes place slowly over a period of several days. Free formaldehyde can be released either directly from the coating mixture or when the coating is cured on the drying machine. The presence of even less than one percent of free formaldehyde, based on the total weight of the product, is undesirable, not only because of its objectionable odor, but because it is an allergen and an irritant, causing severe reactions in the operators who manufacture the coatings and who treat and handle the coated paper.

Discussion of Related Art

The use of the reaction product of urea and glyoxal as an insolubilizer is disclosed in U.S. Pat. No. 3,869,296.

In U.S. Pat. No. 3,917,659 it is disclosed that dry, solid urea-glyoxal products may be obtained by drying the reaction product of from 0.25 to 0.9 mole of urea per mole of glyoxal, and that such products are useful in paper coating compositions and in permanent press applications. A formaldehyde-free insolubilizer for binders in a paper coating composition may be prepared per U.S. Pat. No. 4,471,087 by reacting 3 moles of glyoxal with 1 mole of urea to form a low molecular weight oligomer in a high yield. Treating agents formed by the reaction of ethylene urea with glyoxal are disclosed in Japanese publication No. 5 3044-567, but they too do not have satisfactory properties.

The use of glyoxal and urea in paper coating compositions and in permanent press applications is well-known. Normally, these components are individually added to a paper pulp treating bath in the desired proportions. However, glyoxal is usually available commercially as an aqueous solution and, consequently, unless a proper adjustment is made in the amount added, it may dilute the treating bath to an undesirable extent.

In an effort to try and overcome the disadvantages associated with the use of aqueous glyoxal solutions, attempts have been made to recover glyoxal in a solid form to overcome this problem. These attempts, however, have resulted in an impure glyoxal product containing an appreciable amount of inorganic salt, the presence of which, in many instances, affects the final properties of the treated article.

The present invention provides a process for producing insolubilizers which, when combined with a binder, significantly improve the wet-rub resistance of a coating composition, particularly when applied on paper.

SUMMARY OF THE INVENTION

Other than in the operating examples, or where otherwise indicated, all numbers expressing quantities of ingredients or reaction conditions used herein are to be understood as modified in all instances by the term "about".

It has now been surprisingly found that by adding free glyoxal to a glyoxal-urea adduct an insolubilizer having significantly enhanced wet-rub resistance properties can be formed.

In one embodiment, the present invention provides a process for preparing an insolubilizer useful in coating compositions comprising the steps of:

(a) forming a glyoxal-urea adduct by reacting from about 1.0 to about 4.0 moles of glyoxal with about 1.0 mole of urea, at an elevated temperature, (b) cooling the glyoxal-urea adduct to a temperature of from about 20° C. to about 30° C., (c) adding from about 0.5 to about 2.0 moles of free glyoxal to the glyoxal-urea adduct to form an oligomer, and (d) adjusting the pH of the oligomer to from about 5 to about 7.

In another embodiment of this invention, there is provided a paper coating composition comprising, in combination, at least one pigment, at least one binder, and at least one insolubilizer prepared by:

(a) forming a glyoxal-urea adduct by reacting from about 1.0 to about 4.0 moles of glyoxal with about 1.0 mole of urea, at an elevated temperature, (b) cooling the glyoxal-urea adduct to a temperature of from about 20° C. to about 30° C., (c) adding from about 0.5 to about 2.0 moles of free glyoxal to the glyoxal-urea adduct to form an oligomer, and (d) adjusting the pH of the oligomer to from about 5 to about 7.

In a further aspect of this invention, there is provided a method of coating paper comprising contacting a paper substrate with a paper coating composition comprising, in combination:
(a) at least one pigment,
(b) at least one binder, and
(c) at least one insolubilizer prepared by:
  (i) forming a glyoxal-urea adduct by reacting from about 1.0 to about 4.0 moles of glyoxal with about 1.0 mole of urea, at an elevated temperature,
  (ii) cooling the glyoxal-urea adduct to a temperature of from about 20° C. to about 30° C.,
  (iii) adding from about 0.5 to about 2.0 moles of free glyoxal to the glyoxal-urea adduct to form an oligomer, and
  (iv) adjusting the pH of the oligomer to from about 5 to about 7.

DETAILED DESCRIPTION OF THE INVENTION

Figure 1:
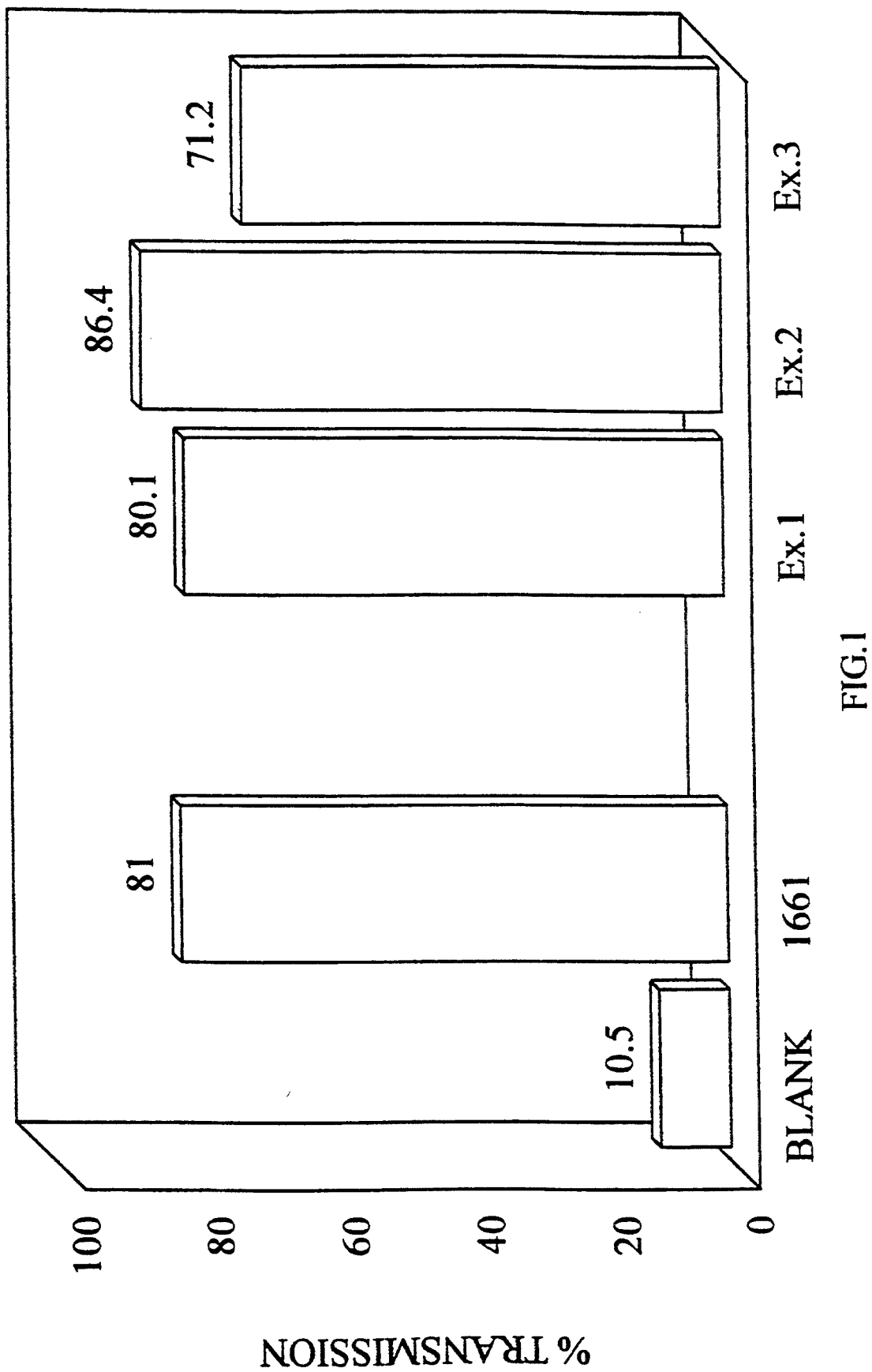
FIG. 1 is a bar graph illustrating a comparison of the results obtained from an Adams Wet-Rub Test performed on experimental coatings allowed to cure for 24 hours.

In the practice of this invention, the glyoxal-urea adduct can be prepared by any suitable and convenient procedure. The glyoxal and urea, used to form the adduct, are generally reacted in stoichiometric amounts wherein a slight excess of glyoxal is preferably employed. The initial molar ratio of glyoxal:urea is from about 1.0:1 to 4.0:1, and preferably is from about 1:1 to 2:1. The initial reaction of the adduct is carried out at room temperature. Once all of the urea has been added to the glyoxal, the reaction is run at an elevated temperature of from about 40° to about 50° C. for about 4.5 hours. The pH may range from about 2.0 to about 5.0, and preferably is within the range of from about 2.0 to about 3.0. The product is a water-soluble adduct. The glyoxal-urea adduct is allowed to cool to from about 20° to about 25° C. Additional aqueous glyoxal solution is then added, under good agitation, to provide a final molar ratio of glyoxal to urea of from about 1.0:1 to about 3.0:1, and preferably from about 1.8:1 to about 2.2:1. The pH of the reaction mixture is adjusted to from about 5.0 to about 7.0 by using for example, caustic soda.

The insolubilizing agent of this invention has reactive sites capable of reacting within the cellulosic hydroxyl group, thus binding the starch or protein molecules in the coating composition. Because of its polymeric nature, the product is capable of reacting with several binder molecules, leading to greater insolubilizing efficiency and so requiring less of the product of this invention than of glyoxal or of a melamine-formaldehyde resin to accomplish the same degree of insolubilization.

The present invention also provides a paper coating composition which imparts significantly enhanced wet-rub resistance onto paper treated therewith. In one embodiment of the invention the paper coating composition comprises, in combination, at least one pigment, at least one binder, and at least one insolubilizing agent prepared by reacting glyoxal and urea in a molar ratio of from about 1.0:1 to 2.0:1, and preferably about 1.4:1 to 1.6:1, to form a glyoxal-urea adduct. The reaction is generally carried out at about room temperature and at a pH range of from about 2.0 to about 5.0, and preferably from about 2.0 to about 3.0. Once all of the urea has been combined with the glyoxal, the reaction temperature is raised to from about 40° to 50° C. and maintained at that temperature for about 4.5 hours. The water-soluble adduct is then cooled to about room temperature, at which time additional aqueous glyoxal solution is added, under good agitation, to provide a final molar ratio of glyoxal to urea of from about 1.0:1 to about 3.0:1, and preferably from about 1.8:1 to about 2.2:1. The pH of the oligomer is then adjusted to from about 5.0 to about 7.0.

In a preferred embodiment, from about 0.01 to about 0.5 percent by weight of the insolubilizer, based on the weight of the binder, is added to the paper coating composition. The paper coating composition also preferably contains from about 85 to about 92 percent by weight of pigment, based on the weight of the composition, along with from about 9 to about 15 percent by weight of a binder, based on the weight of the pigment.

The binders used in the paper coating compositions of this invention include, but are not limited to, unmodified starch; oxidized starch; enzyme-converted starch; starches having functional groups such as hydroxyl, carbonyl, amido, and amino groups; proteins, such as casein; latexes, such as styrene-butadiene resin; and the like, and their mixtures.

The pigments may be clay with or without titanium dioxide and/or calcium carbonate, and the like, and mixtures thereof.

In addition to the binder, the pigment material, and the insolubilizer described above, paper coating compositions may also include conventional materials such as lubricants, defoamers, dispersants, preservatives, colored pigments, and the like, in conventional amounts.

In the paper coating compositions described herein, the amount of binder is based upon the amount of pigment; the ratio varying with the amount of bonding desired and with the adhesive characteristics of the particular binder employed. In general the amount of binder is about 10 to 25 percent, and preferably about 12 to 18 percent, based on the weight of the pigment.

The amount of insolubilizer varies with the amount and properties of the binder and the amount of insolubilization desired; in general it is about 2 to about 10 parts, and preferably from about 2 to about 5 parts, based on the weight of the binder.

The total solids content of the composition generally is within the range of about 40 to about 70 percent, depending upon the method of application and the product requirements.

The compositions of this invention can be applied to paper or paper-like substrates by any known and convenient means.

The present invention also provides a method of treating paper involving contacting the paper with the above-disclosed paper coating composition. The paper coating composition comprises, in combination, at least one pigment, at least one binder, and at least one insolubilizing agent prepared by reacting glyoxal and urea in a molar ratio of from about 1.0:1 to 4.0:1, and preferably about 1.4:1 to 1.6:1 to form a glyoxal-urea adduct. The reaction is generally carried out at about room temperature and at a pH range of from about 2.0 to about 5.0, and preferably from about 2.0 to about 3.0. Once all of the urea has been combined with the glyoxal, the reaction temperature is raised to from about 40° C. to about 50° C. and maintained at that temperature for about 4.5 hours. The water-soluble adduct is then cooled to about room temperature, at which time additional aqueous glyoxal solution is added, under good agitation, to provide a final molar ratio from about 1.0:1 to about 3.0:1, and preferably from about 1.8:1 to about 2.2:1. The pH of the oligomer is then adjusted to from about 5.0 to about 7.0.

In a preferred embodiment, from about 0.01 to about 0.5 percent by weight of the insolubilizer, based on the weight of the binder, is added to the paper coating composition. The paper coating composition also preferably contains from about 85 to about 92 percent by weight of pigment, based on the weight of the composition, along with from about 9 to about 15 percent by weight of a binder, based on the weight of the pigment.

In order that the present invention may be more fully understood, the following examples are given by way of illustration. No specific details contained therein should be construed as limitations on the present invention except insofar as they appear in the appended claims. Unless otherwise specified, all parts and percentages are by weight and all references to temperature are in °C.

EXAMPLE I 217.5 parts (1.5 moles) of a 40% by weight aqueous glyoxal solution was charged into a reaction kettle at a temperature of 22° C. and a pH of 2.3. 60 parts (1.0 mole) of urea was then added into the reaction kettle, under agitation, to provide an initial molar ratio of glyoxal to urea of 1.5:1. The temperature of the reaction mixture was raised to 45° C. by low heat over a period of 5 to 7 minutes and held constant at 45° C. for the next 4.5 hours with proper cooling to form a glyoxal-urea adduct. At the end of this period, the adduct was cooled to 20° C. 72.5 parts (0.5 mole) of the 40% aqueous glyoxal solution was then slowly added to the reaction kettle, under agitation, to form the glyoxal-urea oligomer. The pH of the oligomer was then adjusted to 6.7 with a 25%/wt. solution of caustic soda.

The resulting product was a pale-yellow, clear viscous liquid having negligible odor and containing 46±1% by weight solids. The final molar ratio of glyoxal to urea was 2:1.

EXAMPLE II 145.0 parts (1.0 mole) of a 40% by weight aqueous glyoxal solution was charged into a reaction kettle at a temperature of 21° C. and a pH of 2.2. 60 parts (1.0 mole) of urea was then added into the reaction kettle, under agitation, to provide an initial molar ratio of glyoxal to urea of 1:1. The temperature of the reaction mixture was raised to 45° C. by low heat over a period of 5 to 7 minutes and held constant at 45° C. for the next 4.5 hours with proper cooling to form a glyoxal-urea adduct. At the end of this period, the condensation mixture was cooled to 20° C. 145.0 parts (1.0 mole) of the 40% aqueous glyoxal solution was then slowly added to the reaction kettle, under agitation, to form the glyoxal-urea oligomer. The pH of the oligomer was then adjusted to 6.9 with a 25%/wt. solution of caustic soda.

The resulting product was a pale-yellow, clear viscous liquid having negligible odor and containing 46±1% by weight solids. The final molar ratio of glyoxal to urea was 2:1.

EXAMPLE III 290.0 parts (2.0 moles) of a 40% by weight aqueous glyoxal solution was charged into a reaction kettle at a temperature of 22° C. and a pH of 2.4. 60 parts (1.0 mole) of urea was then added into the reaction kettle, under agitation, to provide an initial molar ratio of glyoxal to urea of 2:1. The temperature of the reaction mixture was raised to 45° C. by low heat over a period of 5 to 7 minutes and held constant at 45° C. for the next 4.5 hours with proper cooling to form a glyoxal-urea adduct. At the end of this period, the condensation mixture was cooled to 20° C. and the pH was adjusted to 6.9 using a 25%/wt. solution of caustic soda.

The resulting product was a pale-yellow, clear viscous liquid having negligible odor and containing 46±1% by weight solids. The final molar ratio of glyoxal to urea was 2:1.

COMPARATIVE PERFORMANCE TESTS

A test coating formulation was prepared as follows:

(A) a 28% by weight oxidized corn starch suspension was made by dispersing 340 parts starch into 1214 parts tap water. The starch suspension was then cooked in an automated laboratory cooker made by Sensor Simulation Products at the following programmed temperature schedule:
Temperature (degrees C): 90 205 150 150
Time (minutes): 28 30 9 120

(B) A clay slurry was made down at 70%/wt. total solids content, containing 100 parts of #2 Kaolin clay, 17 parts of the cooked starch from step (A) and 1 part of calcium stearate commercially available under the tradename Nopcote C-104. The final pH of the resultant coating composition was 8.5.

(C) 1.7 parts of the products of Examples I–III and an insolubilizer commercially available under the tradename Nopcote 1661 were added to separate 400 parts of clay coating composition from step (B), under agitation, to make an addition level of insolubilizers at 2.5% by weight, based on the total dry starch content. The solids content of the insolubilizers was calculated based on the solids content of the raw reaction materials. A blank sample (without insolubilizers) was also prepared.

(D) Brookfield viscosity tests were run on 400 gram aliquots of coatings from step (C) at 10, 20 50 and 100 rpm using a No. 5 spindle at 100° F. The results are shown below in Table I.

(E) Three test paper sheets were coated with coatings from step (C) using a smooth rod applicator and continuously dried on a vacuum suction plate. The coated sample sheets were placed in an oven at 140° C. for about 1 minute to cure the insolubilizers, and then air-dried overnight at ambient conditions. The coated sample sheets were then cut into strips and evaluated for wet-rub resistance using the Adam Wet Rub Tester available from Testing Machine Inc.. The sample sheets underwent 10 seconds of rubbing in the Adam Wet Rub Tester. The coatings that were rubbed off of the tested samples were collected in 15 ml distilled water and tested to determine the transmission of visual light at 625 nm. In this test a high percent transmission is desired as this indicates low extraction of the coating from the paper. The results are reported in transmission (%) and can be found in Table II below.

TABLE I

| | Brookfield Viscosity Measurements | | | |
|---|---|---|---|---|
| Sample No. | 10 rpm (×400) | 20 rpm (×200) | 50 rpm (×80) | 100 rpm (×40) |
| Blank | 11.5 | 13.8 | 18.5 | 24.4 |
| Ex. I | 11.8 | 13.9 | 18.5 | 23.9 |
| Ex. II | 11.5 | 13.5 | 18.1 | 23.5 |
| Ex. III | 11.6 | 13.8 | 18.5 | 23.9 |
| Nopcote 1661 | 12.2 | 14.6 | 19.9 | 26.4 |

TABLE II

| | Adam Wet-Rub Resistance Tests | | |
|---|---|---|---|
| Sample No. | Transmission (%) | Initial Molar Ratio, G:U (glyoxal:urea) | Final Molar Ratio, G:U (glyoxal:urea) |
| Blank | 1 | — | — |
| Ex. I | 62 | 1:1 | 2:1 |
| Ex. II | 87 | 1.5:1 | 2:1 |
| Ex. III | 55 | 2:1 | 2:1 |
| Nopcote 1661 | 54 | 3:1 | 3:1 |

(% transmission measured at 625 nm wavelength)

The above tests show that the materials prepared according to the invention with molar ratios of glyoxal to urea in the range of 2 moles of glyoxal to 1 mole of urea are better than known commercial glyoxal-urea products.

Cylindrical Laboratory Coater Tests

Figure 2:
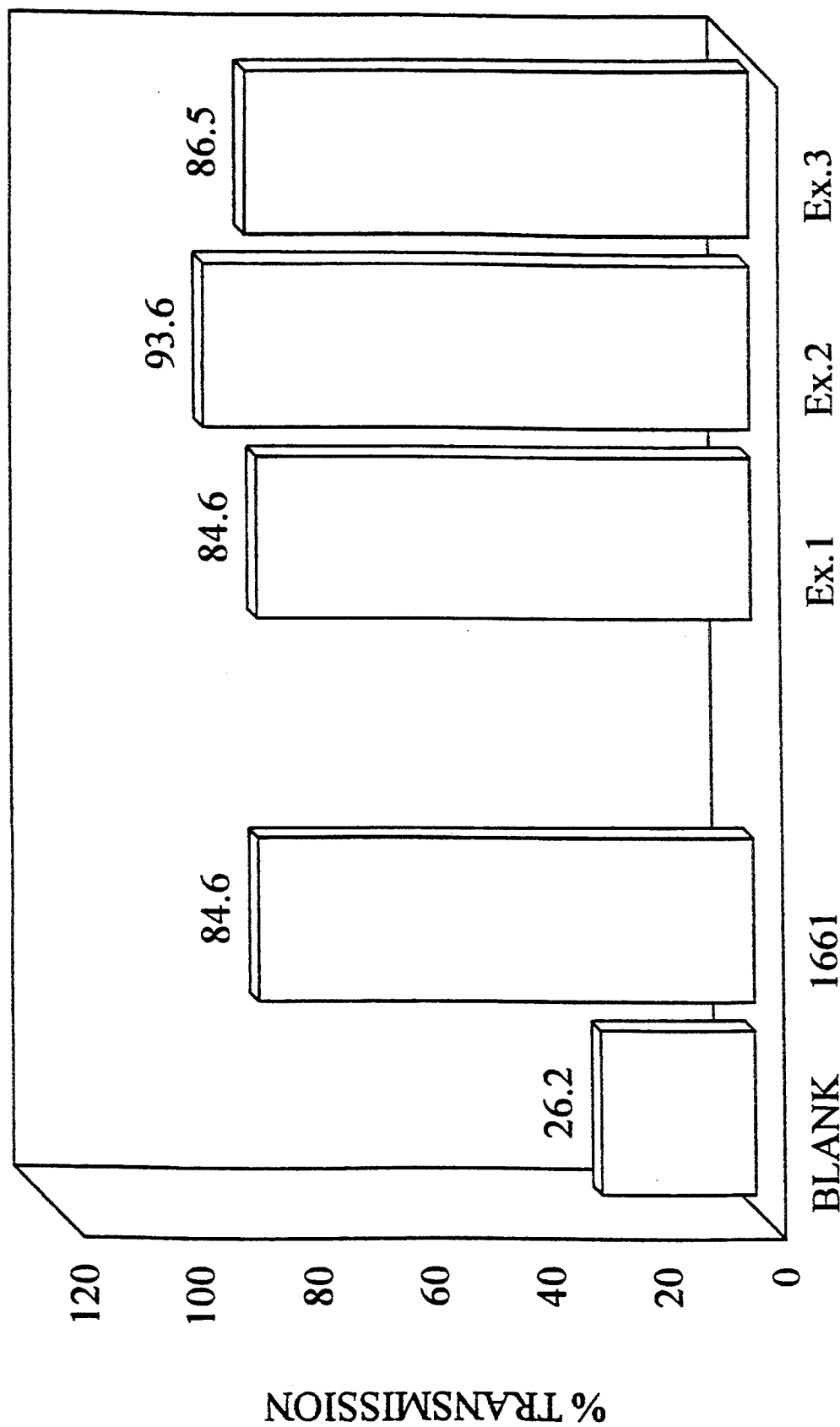
FIG. 2 is a bar graph illustrating a comparison of the results obtained from an Adams Wet-Rub Test performed on experimental coatings allowed to cure for 3 days.
Figure 3:
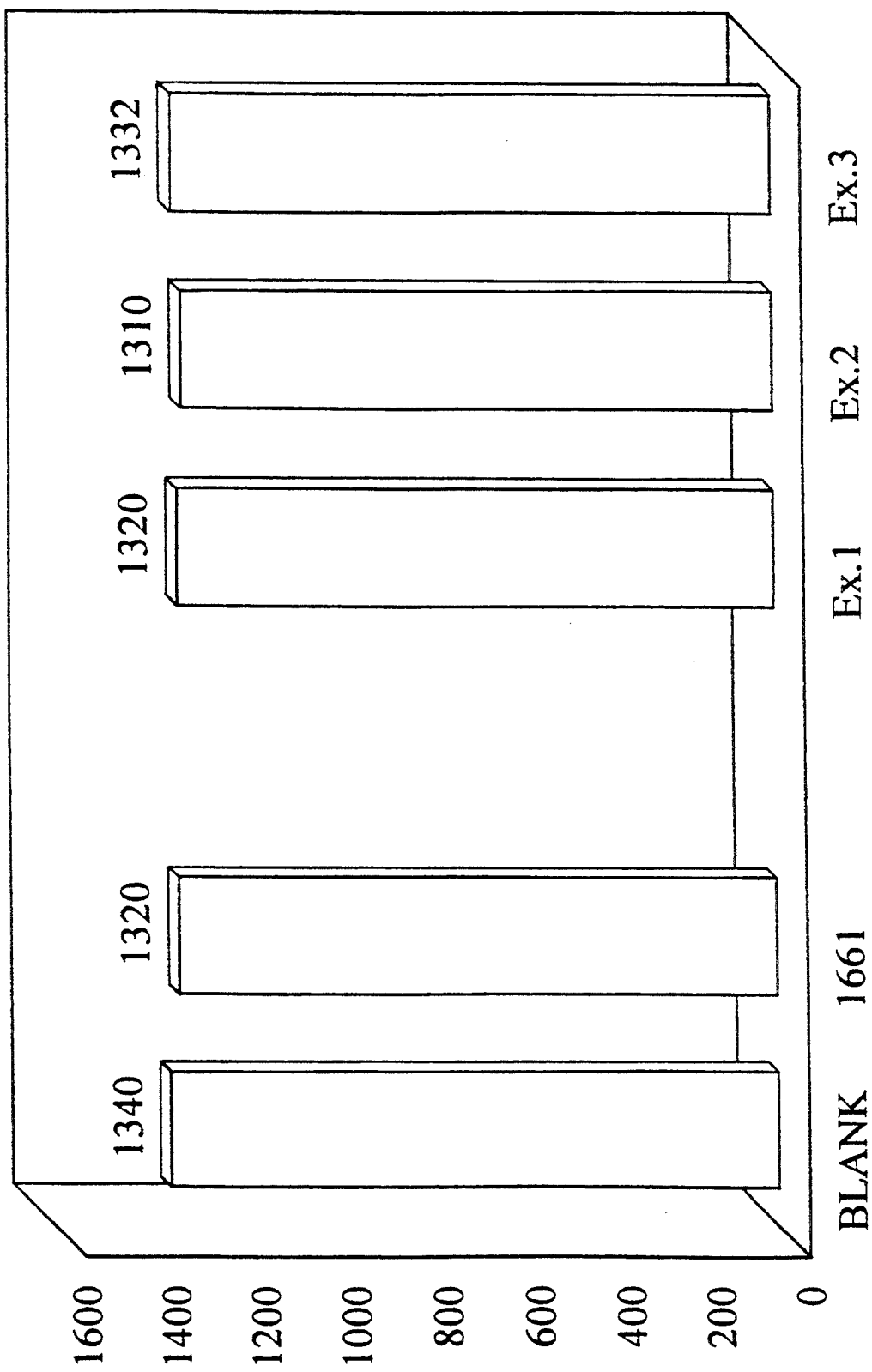
FIG. 3 is a bar graph illustrating a comparison of the viscosity measurements obtained from a Brookfield Viscosity Test.

Three coating formulations (Exs. IV–VI) consisting of a blend of:
(1) 60% #2 Kaolin clay and 40% delaminated clay;
(2) 10 parts cooked oxidized starch;
(3) 5 parts SBR latex, available from Dow Inc.; and
(4) 2.5 parts glyoxal-urea insolubilizer from Examples I, II and III, based on the weight of the binder, were prepared and tested in a cylindrical laboratory coater unit made by Sensor Simulation. The coating speed was 2800 ft/min and the coating weight was 5 pounds. Nopcote 1661 was used as the control. Results of Adams Wet-Rub Tests and Brookfield Viscosity measurements are found in FIGS. 1–3.

While the invention has been described with reference to certain specific embodiments thereof, it is understood that it is not to be so limited since alterations and changes may be made therein which are within the full intended scope of the appended claims.

What is claimed is:

1. A process for preparing an insolubilizer comprising:
   (a) forming a glyoxal-urea adduct by reacting from about 1.0 mole to about 4.0 moles of glyoxal with about 1.0 mole of urea, at an elevated temperature,
   (b) cooling said glyoxal-urea adduct to room temperature,
   (c) adding from about 0.5 mole to about 2.0 moles of free glyoxal to said glyoxal-urea adduct to form a glyoxal-urea oligomer, and
   (d) adjusting the pH of said oligomer to from about 5 to about 7.

2. The process of claim 1 wherein said elevated temperature is in the range of from about 40° C. to about 50° C.

3. The process of claim 1 wherein said glyoxal-urea adduct is cooled to a temperature in the range from about 20° to about 30° C.

4. The process of claim 1 wherein from about 0.5 mole to about 1.0 mole of free glyoxal is added to said glyoxal-urea adduct.

5. A paper coating composition comprising, in combination, at least one pigment, at least one binder, and at least one insolubilizer prepared by:
   (a) forming a glyoxal-urea adduct by reacting from about 1.0 mole to about 4.0 moles of glyoxal with about 1.0 mole of urea, at an elevated temperature,
   (b) cooling said glyoxal-urea adduct to room temperature,
   (c) adding from about 0.5 mole to about 2.0 moles of free glyoxal to said glyoxal-urea adduct to form an oligomer, and
   (d) adjusting the pH of said oligomer to from about 5 to about 7.

6. The composition of claim 5 wherein said elevated temperature is in the range of from about 40° C. to about 50° C.

7. The composition of claim 5 wherein said glyoxal-urea adduct is cooled to a temperature in the range of from about 20° to about 30° C.

8. The composition of claim 5 wherein from about 0.5 mole to about 1.0 mole of free glyoxal is added to said glyoxal-urea adduct.

9. The composition of claim 5 wherein the amount of said insolubilizer is from about 45 to about 47 percent by weight, based on the weight of said binder.

10. The composition of claim 5 wherein said binder is starch.

11. The composition of claim 5 wherein said composition further contains a component selected from the group consisting of an antifoaming agent, a dispersant, a lubricant, and mixtures thereof.

12. A method of coating paper comprising contacting said paper with a paper coating composition comprising, in combination:
   (a) at least one pigment;
   (b) at least one binder, and
   (c) at least one insolubilizer prepared by:
      (i) forming a glyoxal-urea adduct by reacting from about 1.0 mole to about 4.0 moles of glyoxal with about 1.0 mole of urea, at an elevated temperature,
      (ii) cooling said glyoxal-urea adduct to room temperature,
      (iii) adding from about 0.5 mole to about 2.0 moles of free glyoxal to said glyoxal-urea adduct to form an oligomer, and
      (iv) adjusting the pH of said oligomer to from about 5 to about 7.

13. The method of claim 12 wherein said elevated temperature is in the range of from about 40° C. to about 50° C.

14. The method of claim 12 wherein said glyoxal-urea adduct is cooled to a temperature in the range of from about 20° to about 30° C.

15. The method of claim 12 wherein from about 0.5 mole to about 1.0 mole of free glyoxal is added to said glyoxal-urea adduct.

16. The method of claim 12 wherein the amount of said insolubilizer is from about 45 to about 47 percent by weight, based on the weight of said binder.

17. The method of claim 12 wherein said binder is starch.

18. The method of claim 12 wherein said composition further contains a component selected from the group consisting of an antifoaming agent, a dispersant, a lubricant, and mixtures thereof.

* * * * *